(12) United States Patent
Fermigier et al.

(10) Patent No.: US 11,681,165 B2
(45) Date of Patent: Jun. 20, 2023

(54) OPTICAL DEVICE AND MEANS FOR DETECTING DRIVING CONDITIONS

(71) Applicant: Essilor International, Charenton-le-Pont (FR)

(72) Inventors: Bruno Fermigier, Charenton-le-Pont (FR); Dominick Hubacz, Charenton-le-Pont (FR); Marius Peloux, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 293 days.

(21) Appl. No.: 16/757,919

(22) PCT Filed: Dec. 3, 2018

(86) PCT No.: PCT/EP2018/083340
§ 371 (c)(1),
(2) Date: Apr. 21, 2020

(87) PCT Pub. No.: WO2019/110501
PCT Pub. Date: Jun. 13, 2019

(65) Prior Publication Data
US 2020/0363658 A1 Nov. 19, 2020

(30) Foreign Application Priority Data
Dec. 4, 2017 (EP) .................................... 17306702

(51) Int. Cl.
*G02F 1/133* (2006.01)
*G02C 7/10* (2006.01)
(Continued)

(52) U.S. Cl.
CPC ........... *G02C 7/101* (2013.01); *G02B 26/001* (2013.01); *G02F 1/137* (2013.01); *G02F 1/13318* (2013.01); *G02F 1/163* (2013.01)

(58) Field of Classification Search
CPC .. G02F 1/1335; G02F 1/133118; G02F 1/137; G02F 1/163; G02F 1/13306; G02C 7/101; G02B 26/001
See application file for complete search history.

(56) References Cited

U.S. PATENT DOCUMENTS

| 5,552,841 A | 9/1996 | Gallorini et al. |
|---|---|---|
| 8,706,143 B1 | 4/2014 | Elias |

(Continued)

FOREIGN PATENT DOCUMENTS

| DE | 10 2014 208 981 A1 | 11/2015 |
|---|---|---|
| JP | 2004-182006 A | 7/2004 |

(Continued)

OTHER PUBLICATIONS

International Search Report dated Jan. 23, 2019 in PCT/EP2018/083340 filed on Dec. 3, 2018.

*Primary Examiner* — Thoi V Duong
(74) *Attorney, Agent, or Firm* — Oblon, McClelland, Maier & Neustadt, L.L.P.

(57) ABSTRACT

An optical device, to be used by a user driving a vehicle, the optical device including a controllable variable-tint lens and a controller, where the controller is configured to switch the optical device between at least two different modes, at least one mode being a driving mode and when the optical device is in the driving mode, a control parameter of the lens meets at least one driving criterion.

13 Claims, 3 Drawing Sheets

(51) Int. Cl.
    *G02F 1/137*     (2006.01)
    *G02F 1/163*     (2006.01)
    *G02B 26/00*     (2006.01)

(56) References Cited

U.S. PATENT DOCUMENTS

| | | | | |
|---|---|---|---|---|
| 2007/0076166 | A1* | 4/2007 | Kobuchi | G02C 7/10 351/151 |
| 2015/0062469 | A1 | 3/2015 | Fleury | |
| 2015/0338926 | A1* | 11/2015 | Park | G06F 3/014 345/156 |
| 2019/0011730 | A1 | 1/2019 | Bouchier et al. | |

FOREIGN PATENT DOCUMENTS

| | | |
|---|---|---|
| KR | 10-2013-0091872 | 8/2013 |
| WO | WO 2017/009544 A1 | 1/2017 |
| WO | WO 2017/114759 A1 | 7/2017 |

\* cited by examiner

OPTICAL DEVICE AND MEANS FOR DETECTING DRIVING CONDITIONS

The present invention relates to the field of eyewear, more specifically to the field of eyeglasses which optical properties, most importantly transmission, can be controlled depending on a given set of parameters.

The suitable optical properties of a piece of eyewear depend on the conditions of use of said piece of eyewear. Most importantly, a low transmission value can be incompatible with driving. Indeed, driving requires important reactivity and very good perception of the surrounding which cannot be hindered by inadequate transmission.

With the expansion of controllable variable-tint lenses (CVL), developing an optical device capable of adapting to driving conditions comes within reach.

It is known from U.S. Pat. No. 8,706,143 to disable some functionalities of a driver's smartphone when driving conditions are detected. Similar prior Art can be found, including different means for detecting driving conditions such as wrist watches or the like.

Known standalone means for detecting driving conditions include motion analyzers, scenery analyzers, GPS etc.

However, to the best of the Applicant's knowledge, there is still a need to provide an eyewear allowing to have large range of transmission, including e.g. variable TV or variable colors, and at the same time ensuring that an user of the eyewear can drive safely.

The present invention solves the above mentioned problem by providing an optical device, intended to be used by an user capable of driving a vehicle, said optical device comprising
  a. at least one controllable variable-tint lens and
  b. a controller,
wherein the controller is configured to switch the optical device between at least two different modes, wherein at least one mode is a driving mode and wherein when the optical device is in said driving mode, a control parameter of the lens meets at least one driving criterion.

Optical values used to characterize the optical properties of an optical device include for instance $\tau v$ and Q signal.

The control parameter is preferably a minimum transmission.

A preferred optical device according to the invention is an eyewear comprising a frame which can contain a plurality of sensors, and a pair of lenses which transmission can be modified, either manually or automatically. The frame can comprise means for interacting with an external device, such as a smartphone. The frame can also comprise means for executing an algorithm so as to control the properties of the lenses as a function of a set of input parameters.

When the transmission of the lens is automatically controlled, it can be controlled by any known method. A preferred method for automatically controlling the transmission of the lens is the method described in the international patent application WO 2017/009544.

Equation (1) gives the definition of $\tau_v$, where $SD65(\lambda)$ is the spectral repartition of illuminant D65, $T(\lambda)$ is the glass spectral transmission curve and $V(\lambda)$ is the curve associated to the relative spectral luminous efficiency of the human eye:

$$\tau_v = \frac{\int S_{D65}(\lambda) V(\lambda) T(\lambda) d\lambda}{\int S_{D65}(\lambda) V(\lambda) d\lambda} \quad (1)$$

Q signals are normalized parameters associated with a color. There are four different Q signals which correspond to green, red, blue and yellow. Q signals are set so as to ensure that if they are above a minimal threshold, the visibility of traffic light is correct. Q factors are defined in norm ISO 12311 on solar glasses.

The vehicle is typically an automotive vehicle, such as a car, a motorbike or any drivable vehicle. Driving an automotive vehicle typically involves high speed and dense traffic. As such, in order to preserve safety, it is important to preserve the capacity of the user to reliably obtain any suitable optical information on its surroundings. Driving such vehicle can typically involve a legal framework. Typically, most countries have traffic laws which forbid class 4 regime and darker, that is to say a $\tau v$ lower than 8%, for eyewear, when driving.

The transmission of the optical device needs to be especially high in case of lowlight conditions such as twilight or night driving. Most often, the legal framework takes this requirement into account and it is not possible to drive at night if the $\tau v$ is not of at least 75%.

The controllable variable-tint lenses are an eyewear which optical parameters, e.g. its transmission, can be controlled, preferably through electronical means integrated in the frames. Examples of such lenses include electrochromic lenses and liquid-crystal lenses.

In its widest meaning the word electrochromism can relate to any material which reversibly changes color upon application of an electrical signal. However, as used herein, it only designates a material which undergoes reversible changes in optical properties by oxidation and reduction. Usually the electrochromic material may be colourless when an electric field is not applied and may be coloured when an electric field is applied.

An electrochromic device such as an electrochromic lens, i.e. a device containing electrochromic compounds, the absorbance of which depends only on the presence of an electric field, can thus have at least two states, i.e a coloured state (when electrically activated) and a bleached state (in the inactive state). The optical transmission properties of the device depend on the nature of the electrochromic compounds.

The controller used in the present invention is configured to interact with the controllable-variable tint lens and its nature may depend on the controllable variable tint lens. In case the controllable variable-tint lens is an electrochromic lens, the controller will be able to apply proper electric signal so as to influence the electrochromic lens. The controller is preferably configured to be interfaced with means for detecting driving conditions.

Means for automatic detection of driving conditions can prove very useful. Indeed, wearers of Controllable Variable-tint Lenses are likely not to be aware that driving with lenses whose transmission exceeds class 3 is forbidden. And wearers who are aware of this, when driving, would be disturbed if they had to make a manual action, for instance via a button on their frames, to hinder their glasses to darken above class 3.

The means for detecting driving conditions are preferably chosen among a time-of-flight sensor, an inertial measurement unit, a GPS, means for recognizing a communication signal emitted by a car, scenery analyzing means, a plurality of ambient light sensors, and/or UV sensors.

For instance, if the wearer is driving, the windshield or the ceiling of the vehicle could be detected by the time-of-flight sensor. It could be determined that the user is in driving conditions if the time-of-flight sensor measures a distance below a certain threshold, for instance 1 m. A minor drawback of time-of-flight sensors is that it might get fooled by non-driving situations such as looking through a window.

An inertial measurement unit inside the frame or the user's Smartphone's or even an inertial measurement unit inside a wrist-watch could be used along with algorithms to detect driving conditions.

The GPS of the Smartphone or the GPS of the car or even a GPS integrated in the frame could be used to evaluate the acceleration and speed of the driver. This would be extremely reliable but would lead to higher power consumption.

The detection by the frame of any signal specifically emitted by the vehicle could be used to reliably detect driving conditions. Typically, new generations of cars are equipped with internal connection, such as Bluetooth or Zigbee connection, which is very likely to become more and more widespread. The frame or the user's Smartphone could be able to detect the car's internal connection so as to determine driving conditions. Such system allows to reliably determine driving conditions although it needs the frame to embed a internal connection chip and the car's internal connection to be activated.

Means for detecting driving conditions consisting of scenery analyzing means include signal processing applied to the sensor's data of a wide field camera inside the frame. Although these can prove satisfying, it is necessary to integrate a sufficiently small camera in the frame and sophisticated algorithms in the frame's microcontroller.

As an alternative, two ambient light sensors could be integrated in the frame, one directed to a forward direction, and another one directed to an upward direction, perpendicularly to the ground. If the first ambient light sensor detects a high amount of visible light whereas the second ambient light sensor detects a much lower amount, it is possible to determine that the wearer is located inside and looking outside, which corresponds to driving condition. Since the ceiling of a vehicle is generally much lower than the ceiling of a room, it is possible to determine whether the wearer is looking at a window or whether the wearer is inside a vehicle with satisfying accuracy.

The most preferred means for detecting driving conditions is to use UV sensor(s), potentially associated with one or more ambient light sensors inside the frame. Although the majority of industrial transparent materials absorb the UV, the cutoff wavelength can be different between windshields and windows, as illustrated on FIG. 1 which shows transmission measurements realized on two car's windshields and lateral front windows. As such, it is possible to reliably detect whether the user is seated in a driver's seat by choosing one or more spectral ranges inside the UV range, either in the UVA or in the UVB range. This solution can easily be implemented in typical controllable variable-tint lenses frames, with low power consumption.

Preferably, a different algorithm is used to detect driving conditions using the sensor's data depending on the season, on the hour in the day, on the weather conditions and/or on the place on earth, and the position of the wearer's head towards the sun.

The controller can also be configured to be manually triggered so as to switch between the driving mode and another of said at least two different modes. In that case, the whole optical device can be totally deprived of means for detecting driving conditions. However, alternatively, it can also comprise means for detecting driving conditions and have both a manual usage and an automatic usage. It is also possible to combine both usages. For instance, the optical properties of the optical device could be manually changed but whenever the means for detecting driving conditions would detect that the wearer is actually driving, the user could be blocked and no longer be able to switch into a non-driving mode.

The at least one driving criterion preferably comprises having the minimum transmission of the lens strictly superior to a threshold, more preferably strictly superior to 8%. As a matter of fact, a minimum transmission strictly superior to 8% corresponds to class 4+ lenses, which correspond to the legal framework of most countries.

At least one driving criterion can comprise having the minimum transmission of the lens strictly superior to a threshold, and the threshold can be different depending on the outside luminosity, preferably strictly superior to 75% by night. As used herein, by night refers to the time of a day when the sun is no longer visible because it enlightens the other side of the Earth so that no direct sunlight reaches the wearer. However, it is clear that such threshold can also advantageously be used whenever the outside luminosity is below a threshold, even if it is not nighttime. Indeed, when the outside luminosity is lower, optical information are more difficult to perceive for the driver of a vehicle. As such, the transmission of the optical device needs to be higher so as to keep the level of optical information available to the wearer acceptable.

The driving criterion can also comprise having a Q-signal coefficient seen through the lenses above a threshold in every driving condition. Indeed, it is important that the wearer of the optical device is still able to properly perceive colors. In case of a car driver, the different Q-signals seen through the lenses are preferably high enough to allow the driver to distinguish the colors of traffic lights.

The Controllable Variable-tint Lens can be an electrochromic lens. Alternatively, the Controllable Variable-tint Lens can also be a liquid crystal lens. Alternatively, the Controllable Variable-tint Lens can also be obtained through the "Guest-host" technology and can contain dichroic dyes and additional compounds embedded in a liquid crystal matrix.

The controller can be configured to change the properties of the lenses following to a change in driving conditions, preferably following to a change in luminosity, more preferably to a change in luminosity caused by a tunnel. This allows the optical device to reactively adapt to a change in driving conditions.

The present invention also relates to a Controllable Variable-tint Lens configured to be interfaced with a controller capable of switching the lens between at least two different modes, wherein at least one mode is a driving mode and wherein when the lens is in driving mode, a minimum transmission of the lens meets at least one driving criterion.

The present invention also relates to a method of utilization of an optical device according to the present invention, comprising the steps of, upon reception of data pertaining to a driving mode, controlling the transmission of the lens to set a minimum transmission of the lens which meets at least one driving criterion.

The present invention also relates to a computer program comprising instructions for performing a method according to claim 13 whenever said computer program is executed by a processor.

The present invention will be more fully understood from the following detailed description of the embodiments thereof—to which the invention is not limited however—taken together with the drawings in which.

In an exemplary embodiment of the present invention, a driver of a car is provided with an electrochromic lens eyewear. Said electrochromic lens eyewear has two different modes, one mode being adapted for driving requirements so that when the wearer is driving, the eyewear is in its driving mode and this mode ensures that transmission condition allows for safe and comfortable driving.

The eyewear provides a large range of transmission, with variable $\tau v$ and variable colors), while ensuring safe driving to the wearer.

The differences between the two different modes reside in the optical properties of the electrochromic lens, specifically its transmission. In the present exemplary embodiment, the optical properties differ both in terms of TV and spectral characteristics (Hue Chroma).

Driving mode allows filtering characteristics compliant with at least one driving criterion chosen among at least one of: a $\tau_v$ higher than 8% in case of day driving, a $\tau_v$ higher than 75% in case of driving at night, and a Q-signal through the lenses above minimum threshold allowing to properly distinguish traffic lights. For instance, this driving mode may prevent the use of darker mode, or mode having different color/spectral characteristic, these one being only available in non-driving mode. The other mode is adapted for other usage and has at least one different filtering characteristic not complying with at least one driving criterion.

In addition, to improve the comfort of the wearer, the driving mode can be adapted to be compliant with at least one driving criterion. For example, response duration or transmission levels of the lenses, lens color can be adapted.

Driving mode can be automatically detected or manually selected. Means for automatically detecting driving conditions can be integrated directly into the frame, or in the wearer's environment, e.g. his Smartphone or his car itself, as long as it communicates with the wearer's frame (Bluetooth, WiFi, IoT, LiFi, etc.).

In this exemplary embodiment, several means for detecting driving conditions are combined together so as to increase their reliability and efficiency.

Means for detecting driving conditions used in the present invention include UV sensors associated with two ambient light sensors inside the frame of the eyewear. Although the majority of industrial transparent materials absorb the UV, the cutoff wavelength can be different between windshields and windows, as illustrated on FIG. 1 which shows transmission measurements realized on two car's windshields and lateral front windows. As such, it is possible to reliably detect whether the user is seated in a driver's seat by choosing one or more spectral ranges inside the UV range, in both the UVA or in the UVB ranges. This solution can easily be implemented in typical controllable variable-tint lenses frames, with low power consumption.

Figure 1:
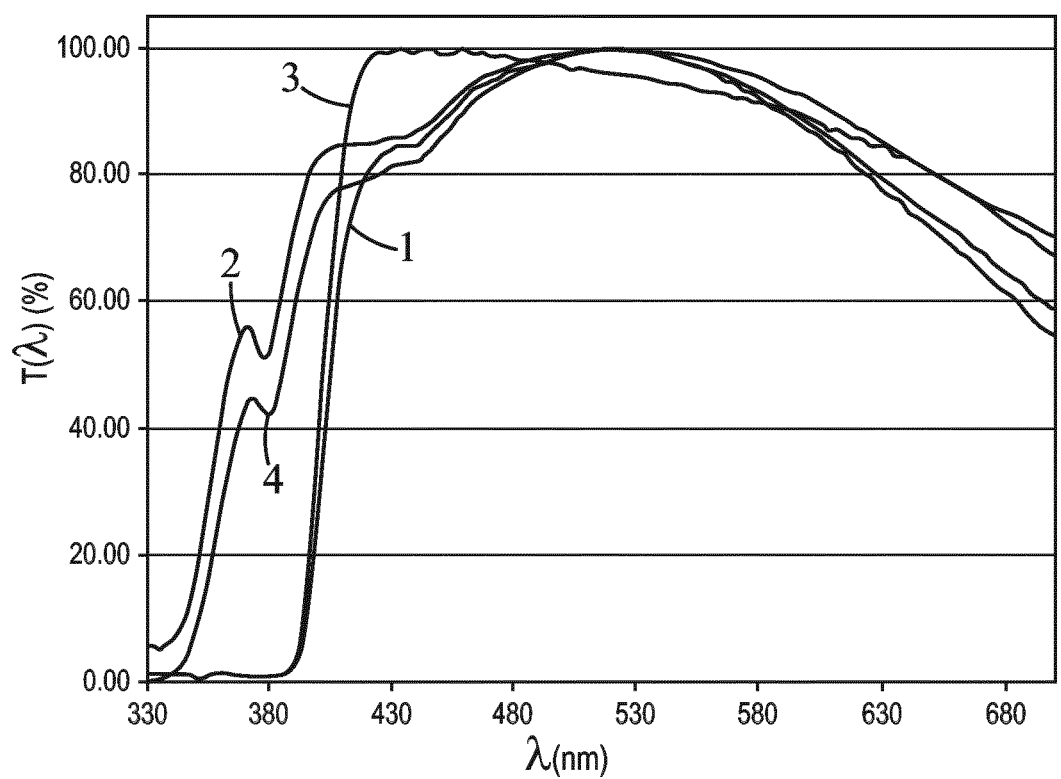
FIG. 1 is a chart showing the comparative transmission measurements realized on two car's windshields and lateral front windows.

On FIG. 1, Curve 1 corresponds to a first car's windshield, Curve 2 corresponds to the first car's lateral front window, Curve 3 corresponds to the windshield of a second car having a different brand than the first car, and Curve 4 corresponds to the lateral front window of the second car.

Curves 1 and 3 have a similar windshield profile whereas Curves 2 and 4 have a similar lateral front profile. The lateral front profiles demonstrate a $T(\lambda)$ above 20% for a wavelength as low as 350 nm. However, the windshield profiles demonstrate a substantially null $T(\lambda)$ for every wavelength lower than about 380 nm.

By evaluating $T(\lambda)$ of a glass in the UV field, e.g. between 350 nm and 380 nm, it is thus possible to determine whether the glass belongs to a windshield or to a lateral-front window with acceptable reliability.

Only one UV sensor can be used. In that case, the difference between the spectral properties of the windshield and the lateral front windows could also be taken into account when determining the position of the UV sensor in the frame. Indeed, if the sensor is positioned on the right of the wearer's face—in case of a car in which the driver is positioned on the left front seat—the UV sensor would only, or mostly, capture the light from the windshield, which would allow for a great increase in terms of accuracy.

Alternatively two UV sensors can be used. A first UV sensor measures $T(\lambda)$ in a lateral direction 40 with respect to the direction of sight of the wearer. Simultaneously; a second UV sensor measures $T(\lambda)$ in a forward direction 50 with respect to the direction of sight of the wearer. If the first sensor detects a UV profile which corresponds to a lateral-front window and, simultaneously, the second UV sensor detects a UV profile which corresponds to a windshield, a signal is sent to a controller meaning that according to this first mean for detecting driving conditions, the wearer of the electrochromic lens eyewear is in driving conditions. Whenever any the UV sensors do not detect the above conditions anymore, a first stop signal is sent to the controller which means that according to this first mean for detecting driving conditions, the wearer of the electrochromic lens eyewear is no longer in driving conditions.

Two ambient light sensors are further integrated in the frame of the eyewear, one directed to a forward direction 30, which can be identical to the direction 50, and another one directed to an upward direction 35, perpendicularly to the ground. If the first ambient light sensor detects an amount of visible light which is above a first threshold whereas the second ambient light sensor detects an amount of visible light which is well below a second threshold, it is possible to determine that the wearer is located inside and looking outside, and a second signal is sent toward the controller, meaning that according to this second mean for detecting driving conditions, the wearer of the electrochromic lens eyewear is in driving conditions. In order to avoid sending the second signal to the controller when the wearer is in front of a window in a room, the second threshold needs to be low enough. Indeed, since the ceiling of a vehicle is much lower than the ceiling of a room, the amount of visible light detected by the second ambient-light sensor is lower in a car than in a room, which means it is possible to determine whether the wearer is looking at a window or whether the wearer is inside a vehicle with satisfying accuracy.

Whenever any the ambient light sensors do not detect the above conditions anymore, a second stop signal is sent to the controller which means that according to this second mean for detecting driving conditions, the wearer of the electrochromic lens eyewear is no longer in driving conditions.

Figure 2:
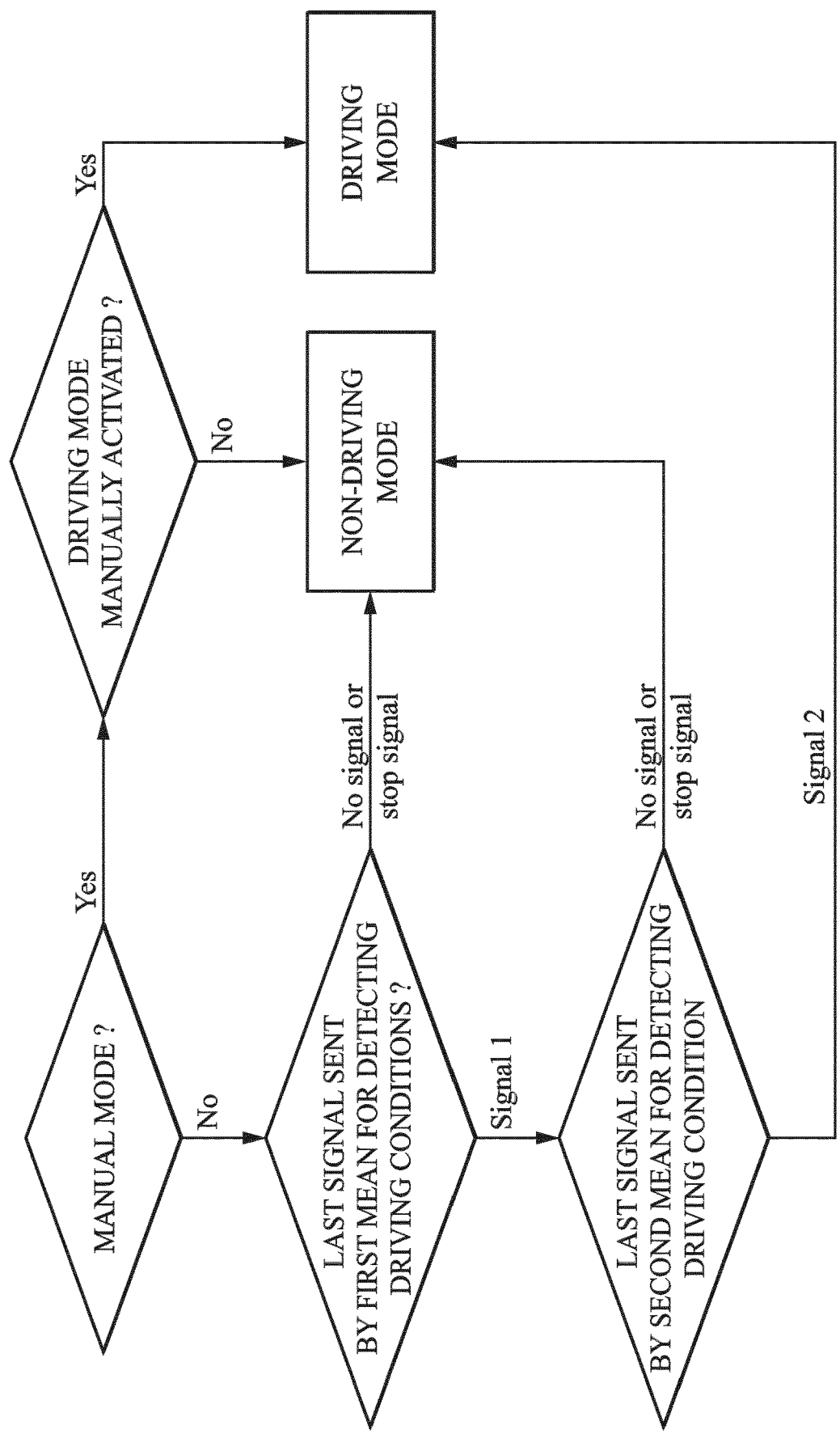
FIG. 2 is a flowchart showing the steps of a method of utilization of an optical device according to the present invention.
Figure 3:
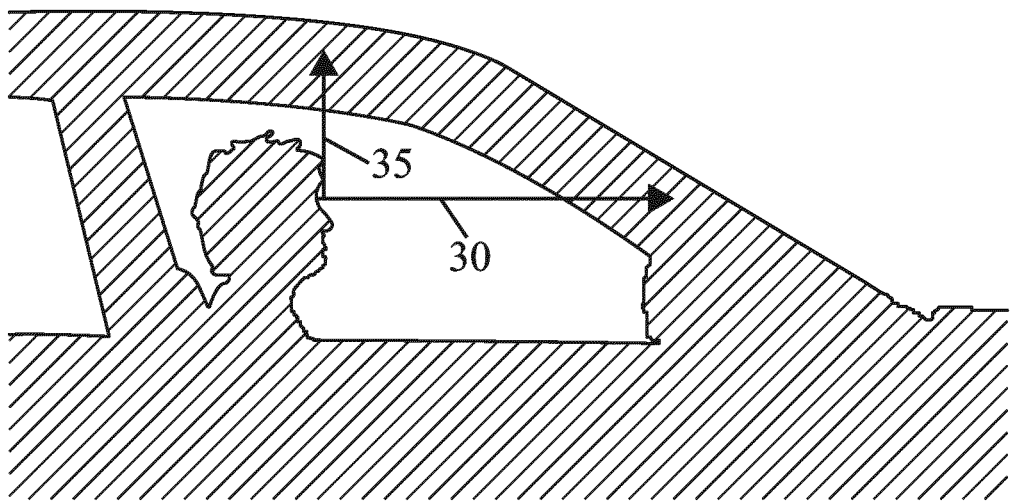
FIG. 3 is a schematic lateral view of a driver inside a vehicle.
Figure 4:
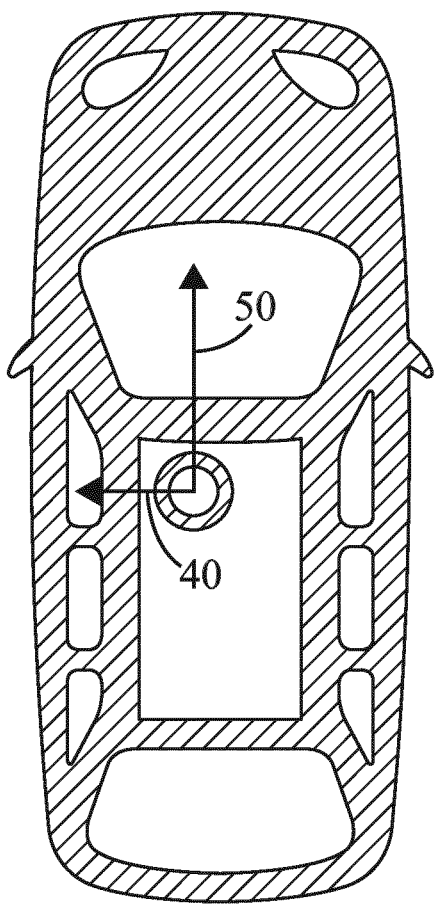
FIG. 4 is a view from above of the driver of FIG. 3.

The controller included into the eyewear according to the present embodiment of the invention is located in the frame. As illustrated on FIG. 2, it is interfaced with the above means for detecting driving conditions. It can be set in two positions: a manual position and an automatic position. When the controller is set in the manual position, the user can manually switch the eyewear between driving mode and non-driving mode. When the controller is set in the automatic position, the eyewear is set in non-driving mode as long as the controller has not received both first and second signals. Whenever the controller receives both first and second signals, the eyewear is set into driving mode. The controller remains in driving mode as long as it has not received a stop signal from any of the means for detecting driving conditions.

In order to set the eyewear in either mode, the controller applies a suitable electric signal to the electrochromic lens so as to modify its transmission into driving range. As explained above, the driving ranges can be related to $\tau_v$ and to Q-signals.

It is understood that the herein described embodiments do not limit the scope of the present invention and that it is possible to implement improvements without leaving the scope of the present invention.

Unless explicitly stated otherwise, the word "or" is equivalent to "and/or". Similarly, the word "one" or "a" is equivalent to "at least one", unless stated otherwise.

The invention claimed is:

1. An optical device intended to be worn by a user driving a vehicle, said optical device comprising:
   at least a controllable variable-tint lens;
   a frame; and
   a controller configured to switch the optical device between at least two different transmission modes of the controllable variable-tint lens, at least one transmission mode being a driving mode defined when the user is detected as driving the vehicle, and another transmission mode being a non-driving mode defined when the user is not detected as driving the vehicle, wherein
   when the optical device is in said driving mode, a control parameter of the lens comprising a minimum transmission of the lens meets at least one driving criterion, and
   the controller is configured to be interfaced with circuitry configured to detect driving conditions, the circuitry being configured to detect the at least one driving mode and the non-driving mode, by detecting whether the user is actually driving or not the vehicle by being seated in a driver's seat or not, respectively, and the circuitry including at least one UV sensor combined with a plurality of ambient light sensors,
   the at least one UV sensor and the plurality of ambient light sensors are integrated in the frame,
   the at least one UV sensor performs transmission measurements on a windshield and on a lateral front window of the vehicle, to detect whether the user is seated in the driver's seat by choosing one or more spectral ranges inside in a UVA or UVB range, a difference between spectral properties of the windshield and the lateral front windows being taken into account,
   two ambient light sensors of the plurality of ambient light sensors comprise a first ambient light sensor directed to a forward direction and a second ambient light sensor directed to an upward direction perpendicularly to a ground, so that when the first ambient light sensor detects an amount of visible light which is above a first threshold and the second ambient light sensor detects an amount of visible light which is below a second threshold, the circuitry determines that the user is located inside the vehicle and looking outside, and
   the at least one UV sensor combined with the two ambient light sensors allow to detect whether the user is driving or not the vehicle.

2. The optical device according to claim 1, wherein the circuitry further includes a time-of-flight sensor, an inertial measurement unit, a GPS, means for recognizing a communication signal emitted by a car or scenery analyzing means, or any combination thereof.

3. The optical device according to claim 1, wherein the controller is configured to be manually triggered so as to switch between the driving mode and another of said at least two different modes.

4. The optical device according to claim 1, wherein the at least one driving criterion comprises having the minimum transmission of the controllable variable-tint lens strictly superior to a threshold strictly superior to 8%.

5. The optical device according to claim 1, wherein the at least one driving criterion comprises having the minimum transmission of the controllable variable-tint lens strictly superior to a threshold, and wherein the threshold is different depending on outside luminosity, being strictly superior to 75% by night.

6. The optical device according to claim 1, wherein the driving criterion comprises having a Q-signal coefficient above a threshold.

7. The optical device according to claim 1, wherein the controllable variable-tint lens is an electrochromic lens.

8. The optical device according to claim 1, wherein the controllable variable-tint lens is a liquid crystal lens.

9. The optical device according to claim 1, wherein the controller is configured to change properties of the controllable variable-tint lens following to a change in driving conditions, following to a change in luminosity including a change in luminosity caused by a tunnel.

10. The optical device according to claim 1, wherein the circuitry comprises two UV sensors which are combined with said two ambient light sensors and which comprise:
    a first UV sensor which measures a glass spectral transmission curve $T(\lambda)$ in a lateral direction with respect to a direction of sight of the user, and
    a second UV sensor which simultaneously measures the glass spectral transmission curve $T(\lambda)$ in a forward direction with respect to the direction of sight of the user,
    so that the first UV sensor detects a UV profile which corresponds to a lateral-front window and simultaneously the second UV sensor detects a UV profile which corresponds to the windshield, a signal is sent to the controller meaning that the user is driving the vehicle.

11. A controllable variable-tint lens configured to be interfaced with a controller configured to switch the controllable variable-tint lens between at least two different transmission modes thereof,
    wherein at least one transmission mode is a driving mode defined when the user is actually driving a vehicle, and another transmission mode is a non-driving mode defined when the user is not driving the vehicle,
    wherein when the controllable variable-tint lens is in the driving mode, a minimum transmission of the lens meets at least one driving criterion, and
    wherein the controller is interfaced with circuitry configured to detect driving conditions, the circuitry being configured to detect the at least one driving mode and the non-driving mode, by detecting whether the user is actually driving or not the vehicle by being seated in a driver's seat or not, respectively, and the circuitry including at least one UV sensor combined with a plurality of ambient light sensors, wherein the controllable variable-tint lens is provided with a frame in which are integrated the at least one UV sensor and the plurality of ambient light sensors, wherein the at least one UV sensor performs transmission measurements on a windshield and on a lateral front window of the vehicle, to detect whether the user is seated in the driver's seat by choosing one or more spectral ranges inside in a UVA or UVB range, a difference between spectral properties of the windshield and the lateral front windows being taken into account, wherein two ambient light sensors of the plurality of ambient light sensors comprise a first ambient light sensor directed to a forward direction and a second ambient light sensor directed to an upward direction perpendicularly to a ground, so that when the first ambient light sensor detects an amount of visible light which is above a first threshold and the second ambient light sensor detects an amount of visible light which is below a second threshold, the circuitry determines that the user is located inside the vehicle and looking outside, and wherein the at least one UV sensor combined with the two ambient light sensors allow to detect whether the user is driving or not the vehicle.

12. A method of utilization of an optical device intended to be worn by a user driving a vehicle, said optical device comprising: at least a controllable variable-tint lens, and a controller configured to switch the optical device between at least two different transmission modes of the controllable variable-tint lens, at least one transmission mode being a driving mode defined when the user is detected as driving the vehicle, and another transmission mode being a non-driving mode defined when the user is not detected as driving the vehicle, wherein when the optical device is in said driving mode, a control parameter of the lens comprising a minimum transmission of the lens meets at least one driving criterion, and the controller is configured to be interfaced with circuitry configured to detect driving conditions, the circuitry being configured to detect the at least one driving mode and the non-driving mode, by detecting whether the user is actually driving or not the vehicle by being seated in a driver's seat or not, respectively, and the circuitry including at least one UV sensor combined with a plurality of ambient light sensors, wherein the optical device further comprises a frame in which are integrated the at least one UV sensor and the plurality of ambient light sensors, wherein the at least one UV sensor performs transmission measurements on a windshield and on a lateral front window of the vehicle, to detect whether the user is seated in the driver's seat by choosing one or more spectral ranges inside in a UVA or UVB range, a difference between spectral properties of the windshield and the lateral front windows being taken into account, wherein two ambient light sensors of the plurality of ambient light sensors comprise a first ambient light sensor directed to a forward direction and a second ambient light sensor directed to an upward direction perpendicularly to a ground, so that when the first ambient light sensor detects an amount of visible light which is above a first threshold and the second ambient light sensor detects an amount of visible light which is below a second threshold, the circuitry determines that the user is located inside the vehicle and looking outside, and wherein the at least one UV sensor combined with the two ambient light sensors allow to detect whether the user is driving or not the vehicle, the method comprising:

upon reception of data pertaining to the driving mode, controlling the transmission of the controllable variable-tint lens to set a minimum transmission thereof which meets the at least one driving criterion.

13. A non-transitory storage medium storing a program comprising instructions for performing the method according to claim 12 whenever said program is executed by a processor.

* * * * *